United States Patent [19]
McLean et al.

[11] Patent Number: 5,861,604
[45] Date of Patent: Jan. 19, 1999

[54] ARC WELDER AND METHOD PROVIDING USE-ENHANCING FEATURES

[75] Inventors: Graham W. McLean, Lymm, United Kingdom; Jeffery J. Jonas, Waukesha, Wis.; Robert D. Kern, Waukesha, Wis.; Gerald C. Ruehlow, Oconomowoc, Wis.; Francis X. Wedel, Lake Mills, Wis.

[73] Assignee: Generac Corporation, Waukesha, Wis.

[21] Appl. No.: 822,009

[22] Filed: Mar. 24, 1997

[51] Int. Cl.$^6$ .................................................. B23K 9/067
[52] U.S. Cl. ..................................... 219/130.5; 219/130.4; 219/133; 219/137 PS; 310/254
[58] Field of Search ............................. 219/130.4, 130.5, 219/133, 134, 137 PS; 310/153, 187, 198, 254

[56] References Cited

U.S. PATENT DOCUMENTS

| | | | |
|---|---|---|---|
| 2,331,773 | 10/1943 | Graham | 219/137 PS |
| 4,293,756 | 10/1981 | Hoyt, Jr. et al. | 219/133 |
| 4,560,857 | 12/1985 | Segawa et al. | 219/130.5 |
| 4,591,766 | 5/1986 | Takaba | 310/254 |
| 4,992,687 | 2/1991 | Nel | 219/133 |
| 5,317,999 | 6/1994 | Kern et al. | 123/182.1 |
| 5,343,016 | 8/1994 | Davis et al. | 219/130.4 |
| 5,376,877 | 12/1994 | Kern et al. | 322/32 |
| 5,444,214 | 8/1995 | Crouse et al. | 219/133 |
| 5,489,811 | 2/1996 | Kern et al. | 310/216 |
| 5,497,735 | 3/1996 | Kern et al. | 123/90.6 |
| 5,504,417 | 4/1996 | Kern et al. | 322/32 |
| 5,537,025 | 7/1996 | Kern et al. | 322/46 |
| 5,624,589 | 4/1997 | Latvis et al. | 219/133 |

Primary Examiner—Clifford C. Shaw
Attorney, Agent, or Firm—Jansson, Shupe, Bridge & Munger, Ltd.

[57] ABSTRACT

A "hot start" method for arc welding includes selecting a first weld current, setting a time interval, striking an arc, flowing a second, higher weld current through the welding rod and then, after a brief time interval, reducing the current through the rod to the value of the first weld current. Also disclosed is a new arc welder stator having two groups of slots around a core. The group of larger slots contains the weld current windings and slots in the group of smaller slots contain windings for timing, gate voltage, battery charging, auxiliary power and the like. A new cooling apparatus for an arc welder has an air duct and a "double-bladed" fan for flowing air along several paths and cooling both the welder control section and the generating section. A new method for electronically controlling engine speed in an engine-driven arc welder is also disclosed. Such method includes manipulating a current-selecting device, contacting a work piece with a welding rod, accelerating the engine to an elevated speed and then either maintaining such speed or reducing it, depending upon the value of weld current selected.

18 Claims, 11 Drawing Sheets

ARC WELDER AND METHOD PROVIDING USE-ENHANCING FEATURES

FIELD OF THE INVENTION

This invention relates generally to welding and, more particularly, to electric arc welding.

BACKGROUND OF THE INVENTION

Electric arc welders, sometimes referred to as "stick welders," are specific types of electrical generators used for joining pieces of metal together. Patents incorporating technology relating to arc welders include U.S. Pat. Nos. 5,317,999 (Kern et al.); 5,376,877 (Kern et al.); 5,489,811 (Kern et al.); 5,497,735 (Kern et al.); 5,504,417 (Kern et al.) and 5,537,025 (Kern et al.), all of which are assigned to the same assignee as this invention.

In arc welding, metal joining is by initially "striking an arc" and thereby passing an electrical current through a thin, stick-like welding rod. The electrical current melts the tip of the rod and, gradually, the rod is consumed in the process. That is, the rod is consumed because it is "laid down" in a molten bead of weld material which quickly hardens to form the welded joint. Rods used in arc welding are formulated using a variety of materials and are made in a variety of diameters, all for specific applications.

The general principle of operation of an arc welder involves applying a voltage potential across a clamp which grips the work piece (actually, one of two pieces to be joined together) and an electrode holder which grips one end of a weld rod. So long as the weld rod does not touch the work piece and complete the electrical circuit, no current flows. But when the rod is touched to the work piece to start current flow, the resulting arc creates sufficient heat to melt the rod and weld the pieces together.

While known arc welders have been and are generally suited for the intended purpose, they are not without disadvantages. One such disadvantage often evidences itself at the start of the welding process, especially when the work pieces are at ambient temperature.

To start the welding process, it is necessary to touch the work piece with the cold, not-yet-molten tip of the rod in order to strike or create the arc, the heat of which progressively melts the rod. And to form a weld of high integrity, the rod must be held so that the portion of such rod which has become molten flows onto and bonds to the pieces to be joined.

To put it in different terms, that extremity of the rod not yet melted must not touch the work piece but, rather, must be maintained at a short distance from such work piece. This is so since it is only in this way that the arc can be sustained. The arc produces high localized heat generally according to the formula $I^2R$ where I is the value of the current flowing through the rod and the arc and R is the electrical resistance across the arc.

Reconciling the seemingly-inconsistent requirements of touching the rod to the work piece to strike an arc and holding the rod a short distance from the work piece during welding takes a good deal of skill and practice. An operator, especially a less-experienced one, is not always successful in doing so.

When the operator is unsuccessful in striking and maintaining an arc, the rod tip fuses or sticks to the work piece. In that event, the rod must be broken away from the work piece and an arc struck anew. And almost invariably, an undesirable and unsightly spot of metal is left on the work piece. Known welders do not offer a satisfactory solution to this problem.

Other disadvantages of known arc welders relate to size and weight. Their size-to-rated-current and weight-to-rated-current ratios are undesirably high. To put it more in the vernacular, they are large and heavy for the rated current they provide. And increased size and weight usually translate into higher cost.

These undesirable attributes arise at least in some part because earlier workers in this field have not fully appreciated how to use available space most advantageously. For example, aspects of the invention disclosed herein involve what might be described as a "triple duty" or multiple-purpose cooling apparatus. Other aspects involve what might be described as a "high-density" stator that combines several different windings in a very compact arrangement.

Yet another disadvantage of known arc welders relate to ambient noise. When the generating section of the welder is powered by an internal combustion engine, it is not unusual to run the engine at rated speed, even though the power output required of the welder is very substantially less than the available engine horsepower at such speed. Of course, an engine running at rated speed produces more noise than one running at some intermediate speed.

A companion disadvantage of known arc welders relates to engine life. An engine which runs at rated speed during substantially all of its operating life will not last as long as one which runs at some intermediate speed during at least a part of such operating life.

The specification describes creative innovations which address the above-described disadvantages in unique ways.

OBJECTS OF THE INVENTION

It is an object of the invention to provide a new arc welder which overcomes problems and shortcomings of prior art welders.

Another object of the invention to provide a new arc welder which aids in striking an arc to initiate the welding process.

Another object of the invention to provide a new arc welder which helps avoid inadvertent fusing of the rod to the work piece.

Another object of the invention to provide a new arc welder which exhibits an improved size-to-rated-current ratio.

Still another object of the invention to provide a new arc welder which exhibits an improved weight-to-rated-current ratio.

Another object of the invention to provide a new arc welder which helps reduce ambient engine noise during certain types of welding operations.

Another object of the invention to provide a new arc welder which provides extended engine operating life. How these and other objects are accomplished will become apparent from the following descriptions and from the drawings.

SUMMARY OF THE INVENTION

A new method for arc welding provides what is referred to as a "hot start" feature. Such feature involves using a temporary, higher level of weld current to facilitate the start of the welding process by preventing or at least minimizing the tendency of the weld rod to adhere to the work piece when the weld arc is struck and the work piece is cold.

The method includes, in either order, the steps of selecting the desired operating weld current (referred to as a first weld current) by setting such current on a first electrical device, e.g., a dial or the like which is located on the operator's control panel. A time interval (the interval during which the temporary higher current is automatically caused to flow) is selected by, e.g., making a setting on a second electrical device, e.g., another dial. The dial may be calibrated in time, e.g., seconds, or, more preferably, in percentages of some maximum "hot start" interval. When the method is practiced in a welder of a specific embodiment, the first and second electrical devices comprise potentiometers coupled to a microprocessor.

An arc is struck and a second, higher weld current flows through the welding rod. Upon the lapse of the selected time interval, the current through the rod is reduced to the value of the selected operating weld current.

Other aspects of the method contemplate that weld current is provided by a generator driven by an internal combustion engine. The method steps depend upon the relationship of the selected operating weld current to a predetermined value of current. If the selected operating current is above this predetermined value, the flowing step includes accelerating the engine to an elevated speed and the reducing step includes maintaining the speed of the engine at the elevated speed. On the other hand, if the operating current is selected to be equal to or less than such predetermined value, the flowing step includes accelerating the engine to an intermediate speed and the reducing step includes maintaining the speed of the engine at the intermediate speed.

In very specific aspects of the method, the above-noted predetermined value is 25% of the maximum rated weld current and the "hot start" time interval is less than six seconds, most preferably about four seconds. And the temporary, higher weld current is less than 1.8 times the first or normal weld current, most preferably about 1.5 times such current.

Another feature from which the arc welder derives its desirable attributes involves a new stator. Such stator has a generally cylindrical, laminated core having an axis of rotation and a first group of slots radially spaced around the core. The stator also has a second group of slots radially spaced around the core, each slot of the second group being interposed between pairs of slots comprising the first group. Each of the slots of both groups has a slot width and the width of the slots comprising the second group is less than the width of the slots comprising the first group.

And the new stator may be described in other terms. Each slot comprising the groups of slots has a root and the roots of the slots comprising the first group of slots are spaced from the axis of rotation by a first dimension. The roots of the slots comprising the second group of slots are spaced from the axis of rotation by a second dimension which is different than the first dimension and in a highly preferred embodiment, the second dimension is greater than the first dimension.

The stator may be configured for use in an arc welder driven by an internal combustion engine. The slots comprising the second group of slots include a first slot having a timing winding therein for providing a signal representing engine speed. And if the arc welder has an auxiliary power outlet, a known but highly desirable feature, the slots comprising the second group of slots include a second slot having an auxiliary power winding therein for providing electrical power to the auxiliary power outlet.

In a specific, computer-controlled arc welder, arc welder current is provided by thyristors switched to a conducting state by a gate voltage. In the new stator, the slots comprising the second group of slots include a third slot having a gate voltage winding therein for providing the gate voltage. And when the arc welder has a battery charging outlet, another known but highly desirable feature, slots comprising the first group of slots include a slot having a battery-charging winding therein for providing electrical power to the battery charging outlet.

And that is not all. The new arc welder has yet other features contributing to its improved size-to-power ratio. Such welder has a cooling apparatus including an air duct and a fan mounted for rotation with respect to the duct. The fan includes a first set of blades projecting in a first direction and a second set of blades projecting in a second direction. As will become apparent, such "double-bladed" fan performs several cooling functions.

The arc welder has a weld current control section and the first set of blades flows air along a first flow path through the duct to the current control section. More specifically, the current control section includes a plurality of solid state switching devices in heat transfer relationship to a heat sink and a printed circuit board fixed with respect to the air duct. The first flow path comprises a primary path of cooling air impinging against the heat sink and a secondary or "branched" path of cooling air impinging against the printed circuit board.

The welder also has a generating section comprised of the stationary stator and a concentric rotor therearound having a number of permanent magnets affixed thereto. The second set of blades flows air along a second flow path for cooling the generating section.

Another new innovation helps reduce noise and prolong engine life under certain current-dependent operating conditions. Such innovation involves a method for electronically controlling engine speed in an engine-driven arc welder having a rated maximum current. The welder has a welder controller with a microprocessor and a current-selecting device coupled thereto. (In this specification, such current-selecting device is also referred to as the first electrical device.)

The method includes manipulating the device to select a weld current no greater than the rated maximum current and then contacting a work piece with a welding rod connected to the welder. The engine is accelerated to an elevated speed, e.g, the maximum rated speed which, in a specific embodiment, is about 3900 RPM. That weld current which was selected is then determined by, for example, sensing the voltage established across the current-selecting device.

The determining step is followed by the step of decelerating the engine to an intermediate speed if the weld current selected is no greater than 50% of the rated maximum current. On the other hand, if the weld current selected is greater than 50% of the rated maximum current, the determining step is followed by the step of maintaining the engine at the elevated speed. In a more specific aspect of the method, the engine is decelerated to an intermediate speed if the weld current selected is no greater than 25% of the rated maximum current or is maintained at the elevated speed if such selected weld current is equal to or greater than 25% of such rated maximum current.

In other, more specific aspects of the method, the welder has a ground terminal and an electrode terminal and the microprocessor has a voltage-sensing circuit coupled thereto for detecting the voltage across the terminals. There is also a current-sensing circuit coupled to the microprocessor for detecting the current flowing between the terminals.

The contacting step is followed by the steps of providing to the microprocessor a voltage signal representing the voltage between the terminals and also providing to such microprocessor a current signal representing the current flowing between the terminals. The accelerating step occurs only if the voltage between the terminals is less than a predetermined voltage and the current flowing between the terminals is greater than a predetermined current.

Other aspects of the invention are set forth in the detailed description and in the drawings.

DETAILED DESCRIPTION OF PREFERRED EMBODIMENTS

Figure 1:
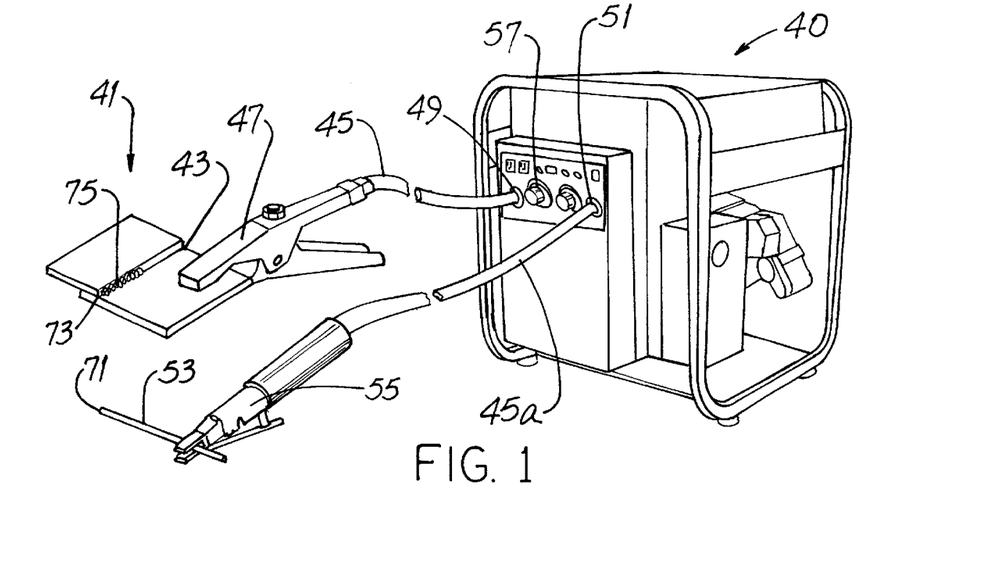
FIG. 1 is a perspective view of the new arc welder. Parts are broken away.
Figure 2:
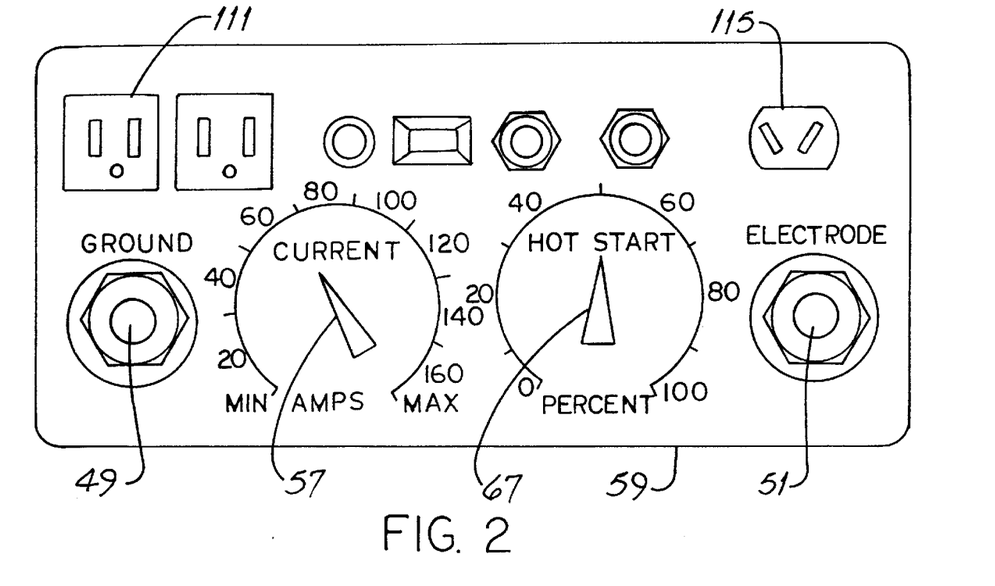
FIG. 2 is an elevation view of the welder control panel.

Before describing the new arc welder 40 and related method and features in detail, it will be helpful to have an understanding of how the welder 40 is used. Referring to FIGS. 1 and 2, it is assumed that the operator wishes to join the two metal plates 41 along the joint line 43. Such plates 41 are referred to as the "work piece" and it is assumed that the plates 41 are cold, i.e., at ambient temperature. (An arc is more difficult to strike and successfully sustain when the plates 41 are cold.)

Figure 3:
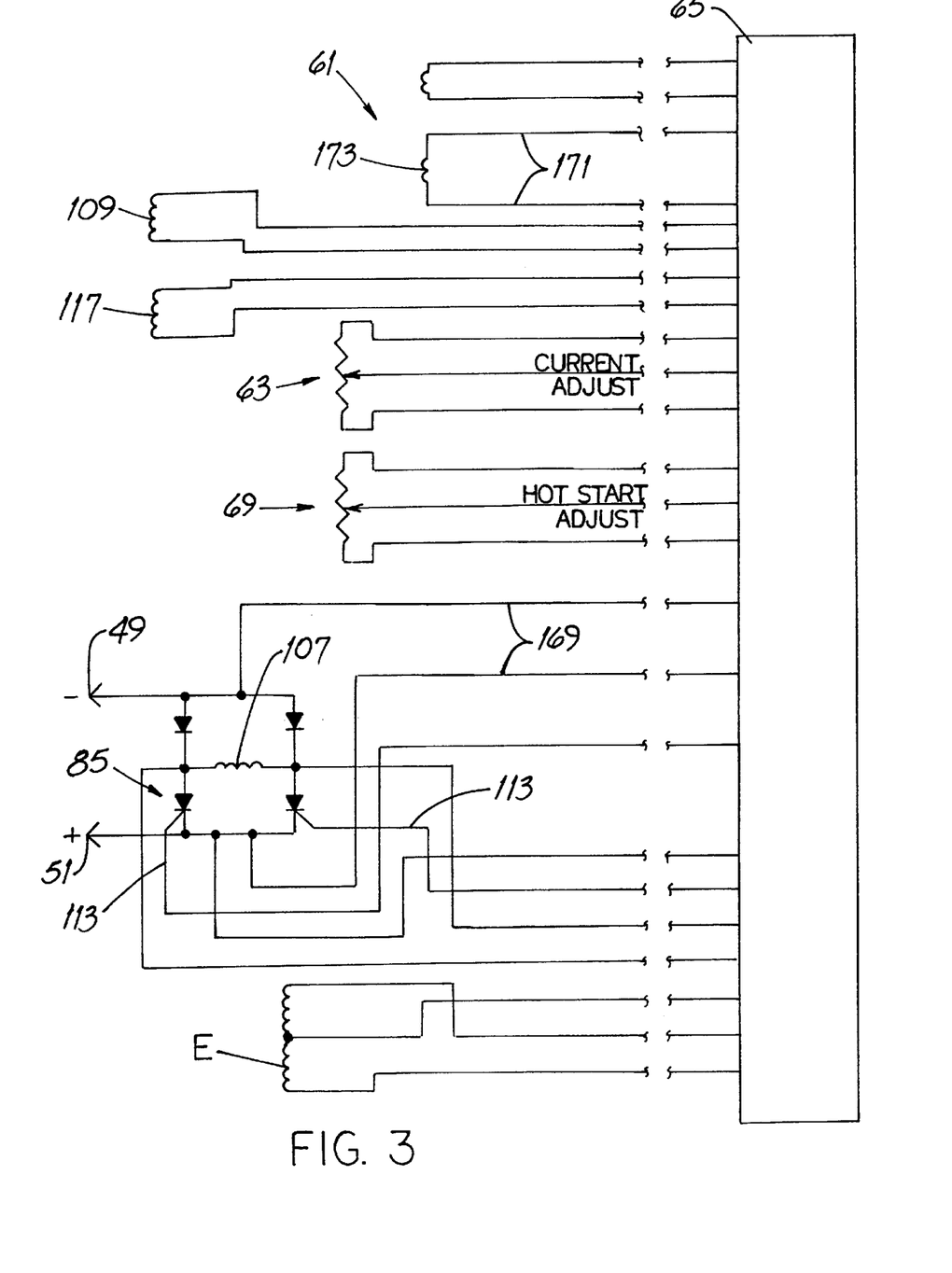
FIG. 3 is a simplified circuit diagram of a portion of the welder control circuit.

An electrical cable 45 and its work clamp 47 are connected to the ground terminal 49 and to the plates 41, respectively. Another electrical cable 45a is connected to the electrode terminal 51 and one end of a weld rod 53 is clamped in its electrode holder 55. Using experiential judgment as to required current, the operator selects the desired first weld current on the dial 57 of the electrical control panel 59. Referring also to FIG. 3 showing aspects of the welder controller 61, the dial 57 is connected to a first electrical device embodied as the potentiometer 63 which is coupled to the microprocessor 65. For purposes of explanation, it is assumed that the operator selects 70 amperes as the desired weld current.

It is also assumed that the operator wishes to avail himself or herself of the highly-desirable hot start feature which uses a temporary, higher level of weld current, the second current, to facilitate the start of the welding process. To do so, a time interval (the interval during which the temporary higher current is automatically caused to flow) is selected by making a setting on the dial 67. Such dial 67 is connected to a second electrical device comprising potentiometer 69 coupled to the microprocessor 65. As when setting current, such time interval is selected using experiential judgment in view of the type of metal being joined, metal thickness, type of weld rod 53 and the like.

The dial 67 is calibrated in time, e.g., seconds, or, more preferably, in percentages of some maximum hot start interval. In a specific embodiment of the welder 40, the maximum hot start interval is four seconds. Therefore, when the operator selects an exemplary 50% on the dial 67, the interval during which a higher level of current is caused to flow is two seconds, i.e., 50% of four seconds. And in a specific embodiment, the welder 40 is configured so that the magnitude of such temporary, higher level of current is 150% of the value of current set on the dial 67. (It is to be appreciated that the maximum hot start time interval and the magnitude of the higher level of current as a function of the selected current can vary within rather broad limits without departing from the spirit of the invention.)

To commence welding, the tip 71 of the rod 53 is touched to the plates 41 at the location 73 to strike the arc and to commence flowing a bead of weld 75 along the joint line 43. (To aid understanding, a portion of an already-laid-down bead 75 is shown in FIG. 1.) Assuming that an arc is successfully struck (and also assuming the exemplary values set forth above), the current through the rod 53 and the arc will be about 105 amperes (70 amperes×1.5) for an interval of about two seconds. Thereafter, the weld current will reduce to about 70 amperes.

Figure 4:
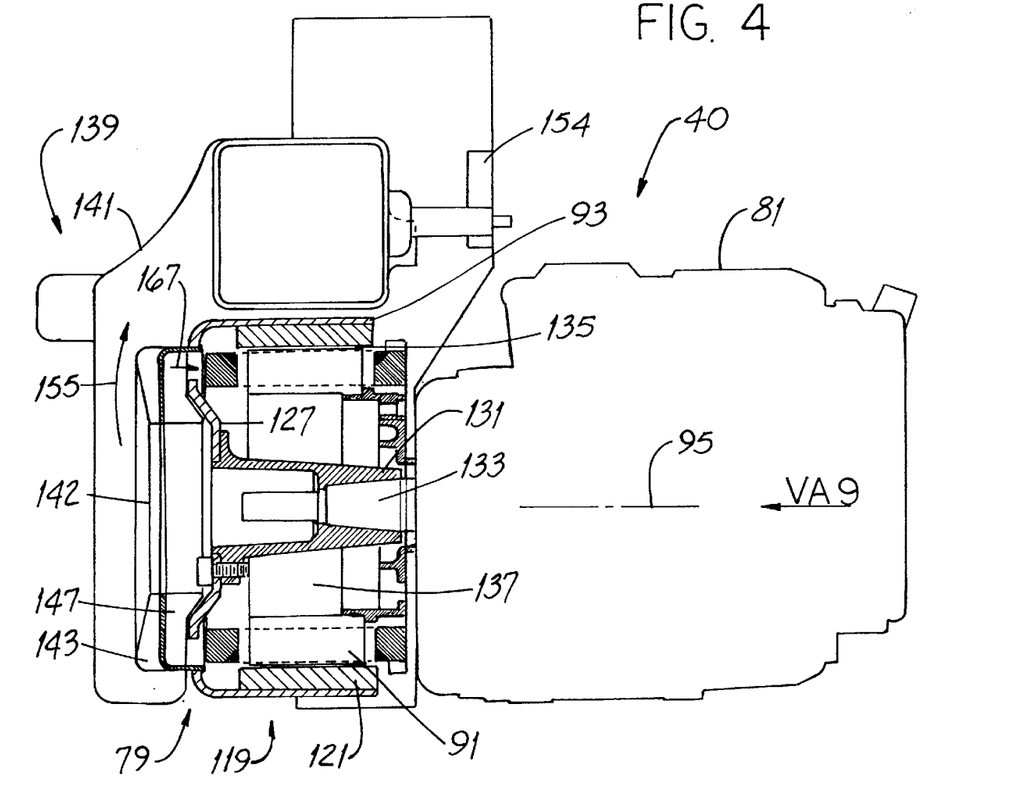
FIG. 4 is an elevation view, partly in section, of the new arc welder.
Figure 5:
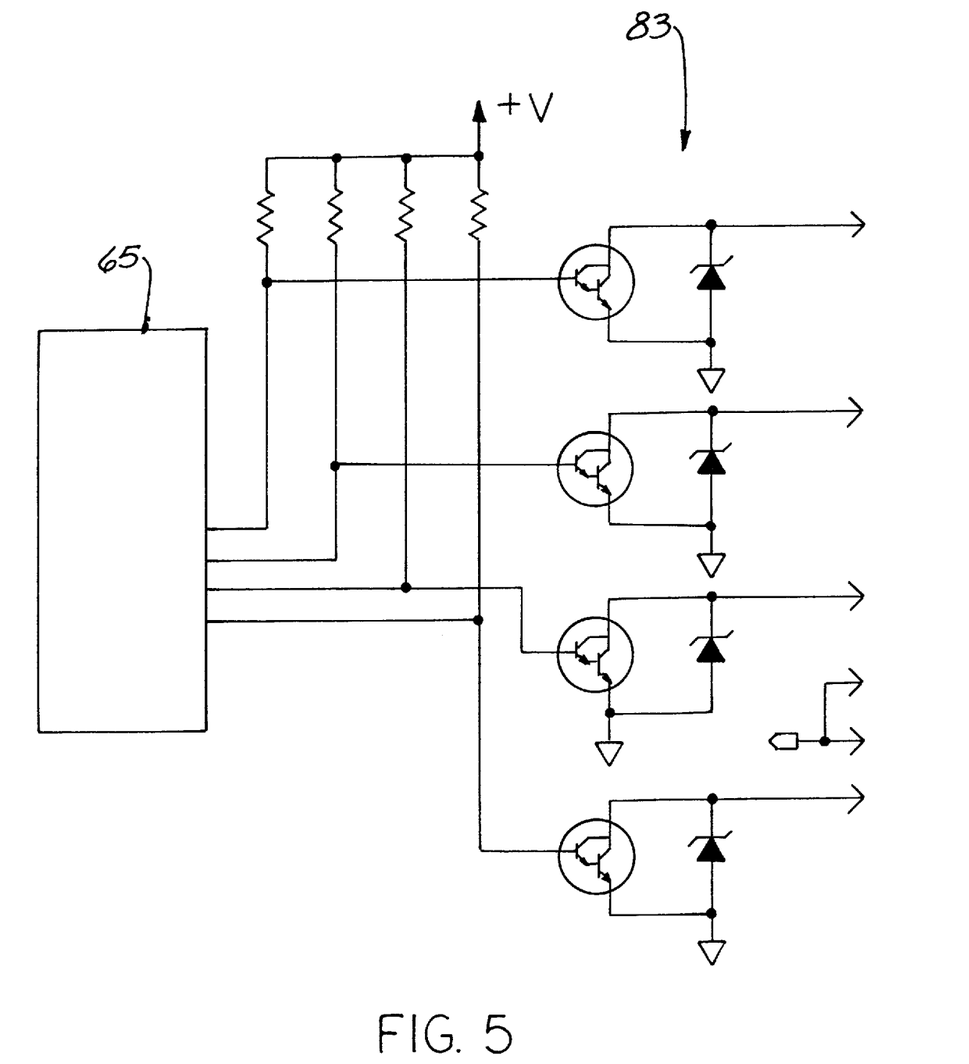
FIG. 5 is a simplified circuit diagram of another portion of the welder control circuit.

Referring also to FIG. 4, other aspects of the method contemplate that weld current is provided by a generator 79 driven by an internal combustion engine 81. The method steps depend upon the relationship of the selected operating weld current to a predetermined value of current. If the selected operating current is above this predetermined value, the flowing step includes accelerating the engine 81 to an elevated speed and the reducing step includes maintaining the speed of the engine 81 at the elevated speed. On the other hand, if the operating current is selected to be equal to or less than such predetermined value, the flowing step includes accelerating the engine 81 to an intermediate speed and the reducing step includes maintaining the speed of the engine 81 at the intermediate speed.

The following examples will further illuminate the method. It is assumed that the engine idle speed is 2400 RPM, that the intermediate speed is 3000 RPM and that the elevated or maximum speed is 3900 RPM. It is also assumed that the maximum rated weld current available from the welder 40 is 170 amperes and that the predetermined value of current is 25% of such maximum rated weld current.

It is further assumed that the operator selects a normal operating current of 35 amperes (about 20% of the 170 ampere maximum rated current) and that the hot start feature is used. When welding is commenced, the engine 81 is accelerated to the intermediate speed of 3000 RPM. Such speed is maintained notwithstanding that the hot start feature causes a temporary higher level of current of about 52 amperes (35 amperes×1.5) which is more than 25% of the maximum current.

In the next example, it is assumed that the operator selects a normal operating current of 100 amperes (which is well in excess of 25% of the maximum current) and that the hot start feature is used. When welding is commenced, the engine 81 is accelerated to 3900 RPM and maintained there even after the hot start time interval has lapsed. Engine speed control is preferably by a stepper motor coupled to the engine throttle actuator and incrementally indexed by the stepper motor drive circuit 83 coupled to the microprocessor 65. A stepper motor arrangement is disclosed in U.S. Pat. No. 5,497,735 (Kern et al.) which is incorporated herein by reference.

The above-described control strategy offers a number of advantages. One is that the engine speed is reduced when only a modest level of weld current is required. Ambient noise is thereby reduced and engine life prolonged.

Another advantage relates to the physical size of the choke or inductor used to filter the "ripple" out of the thyristor pulsating DC output. At reduced engine speed and assuming a current requirement not in excess of the exemplary 25% of maximum current, the power thyristors 85 shown in FIG. 3 are switched to a conducting state for a greater portion of each electrical wave cycle than would be the case if the engine 81 were running at maximum speed.

To state it in different exemplary terms, for an operating current of, say, 35 amperes, the power thyristors 85 are, at 3000 RPM engine speed, switched "on" for a greater portion of each wave cycle than would be the case at 3900 RPM engine speed. And the pulsating output from a "more-fully-turned-on" thyristor 85 is easier to filter than is the pulsating output of a "less-fully-turned-on" thyristor 85. Therefore, the inductor used to filter the "ripple" from such pulsating output (and therefore provide substantially pure DC current) is physically smaller.

Figure 6:
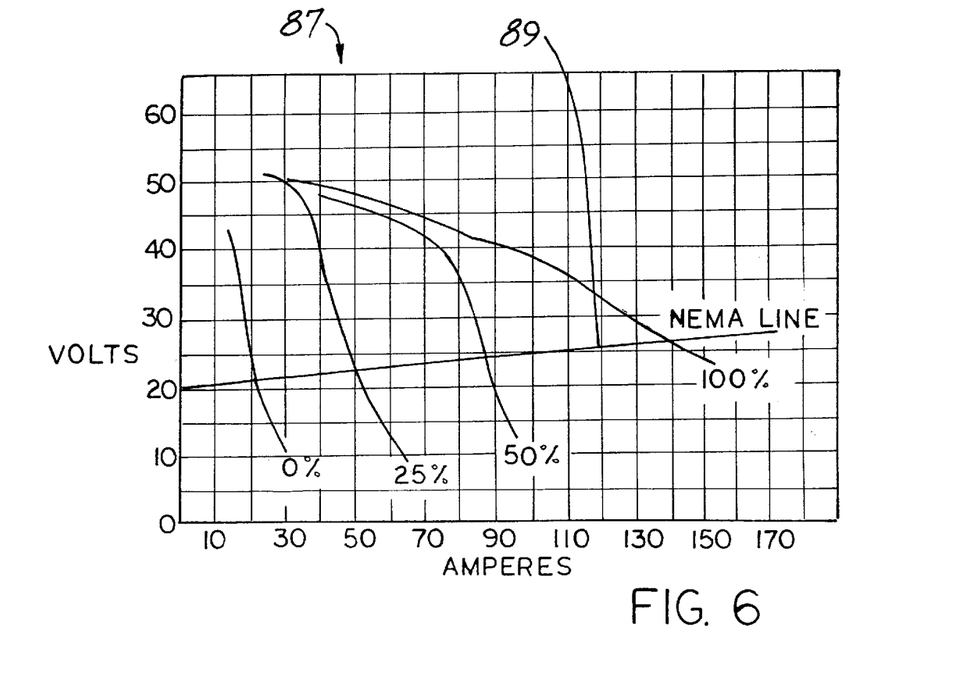
FIG. 6 a performance graph of the operating characteristics of an exemplary arc welder.
Figure 7:
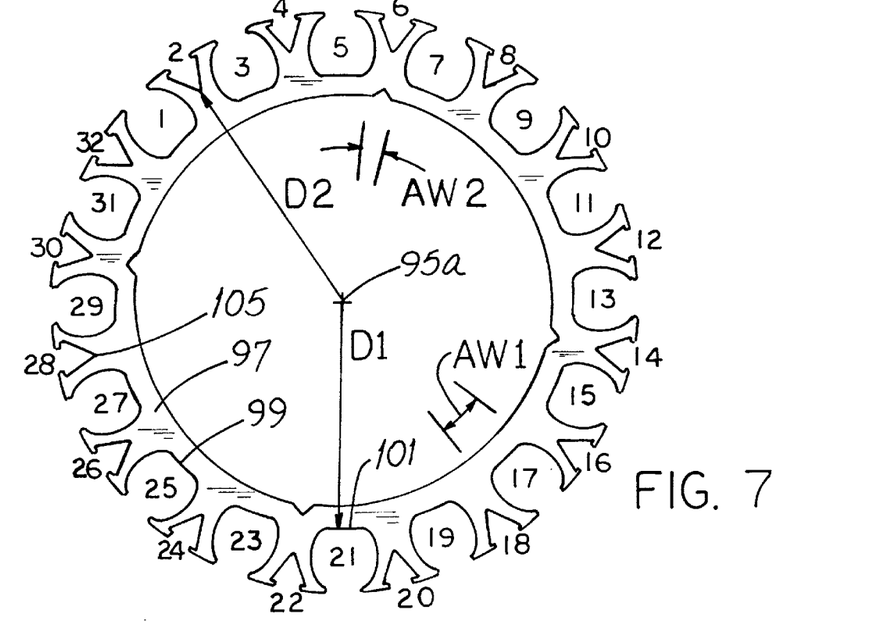
FIG. 7 is a view of the welder stator core taken along the axis of rotation.

FIG. 6 shows a performance graph 87 for an exemplary welder 40. Setting the dial 57 causes the welder 40 to operate along what is generally referred to as the NEMA line 89. Such line 89 is so named because it is specified by a standard established by the National Electrical Manufacturers Association. Referring next to FIGS. 4, 7, 8A, 8B and 9, another feature from which the arc welder 40 derives its desirable attributes involves a new stator 91. Such stator 91 (which, of course, does not rotate) is concentric with and circumscribed by an engine-driven rotor 93 which rotates about the axis of rotation 95. Such stator 91 has a laminated core 97 which, when viewed along an axis 95a coincident with the rotor axis of rotation 95 as shown in FIG. 7, is generally cylindrical.

The stator 91 has a first group of larger slots, comprising slots 1, 3, 5, 7, 9, 11, 13, 15, 17, 19, 21, 23, 25, 27, 29 and 31, which are radially spaced around the core 97. Each of these larger slots is generally U-shaped and has a root 99 which is slightly curved and forms an arc 101 which is spaced from the axis 95a by a first dimension D1. The maximum arc width of the slots in the first group (slots 1, 3, 5, 7 and so forth through slot 31) is denoted as AW1 and the power windings including the main weld windings A, B, C, D and the battery charge winding 103 (shown in FIGS. 10 through 14) are lodged in such larger slots 1, 3, 5 and so forth.

The stator 91 also has a second group of smaller slots, comprising slots 2, 4, 6, 8, 10, 12, 14, 16, 18, 20, 22, 24, 26, 28, 30 and 32, radially spaced around the core 97 and in which are lodged what might be termed ancillary windings. Each slot of the second group is interposed between pairs of slots 1, 3, 5 and so forth, comprising the first group.

Each of the slots comprising the second group (slots 2, 4, 6, 8 and so forth through 32) is generally V-shaped and has a root 105 which defines an apex. The roots 105 of the slots comprising the second group are spaced from the axis 95a by a second dimension D2 which is greater than the first dimension D1. And each of the slots comprising the second group has a maximum arc width denoted as AW2 which is less than the width AW1 of the slots comprising the first group. Referring particularly to FIGS. 3, 15, 16, 17 and 18, other windings including the thyristor supply windings E and F, the auxiliary power winding 107 and the timing winding 109 are lodged in those slots comprising the second group (slots 2, 4, 6, 8 and so forth through 32).

Referring to FIGS. 2, 4, 7, 8A and 8B the slots 2, 4, 6 and so forth comprising the second group of slots include a first slot 32 having the timing winding 109 therein for providing a signal representing engine speed. And if the arc welder 40 has an auxiliary power outlet 111, the slots comprising the second group of slots include a second slot 10 having the auxiliary power winding 107 therein for providing electrical power to the auxiliary power outlet 111.

Referring to FIGS. 1, 2, 3, 8A, 8B, 15, 16 and 19 in a specific, computer-controlled arc welder 40, arc welder current is provided by thyristors 85 switched to a conducting state by a gate voltage applied at the lead 113. In the new stator 91, the slots 2, 4, 6 and so forth comprising the second group of slots include a third slot 10 having a gate voltage winding i.e., supply winding E, therein for providing the gate voltage. And when the arc welder 40 has a battery charging outlet 115, another highly desirable feature, slots 1, 3, 5 and so forth comprising the first group of slots include a slot 2 having a battery-charging winding 117 therein for providing electrical power to the battery charging outlet 115.

Figure 8A:
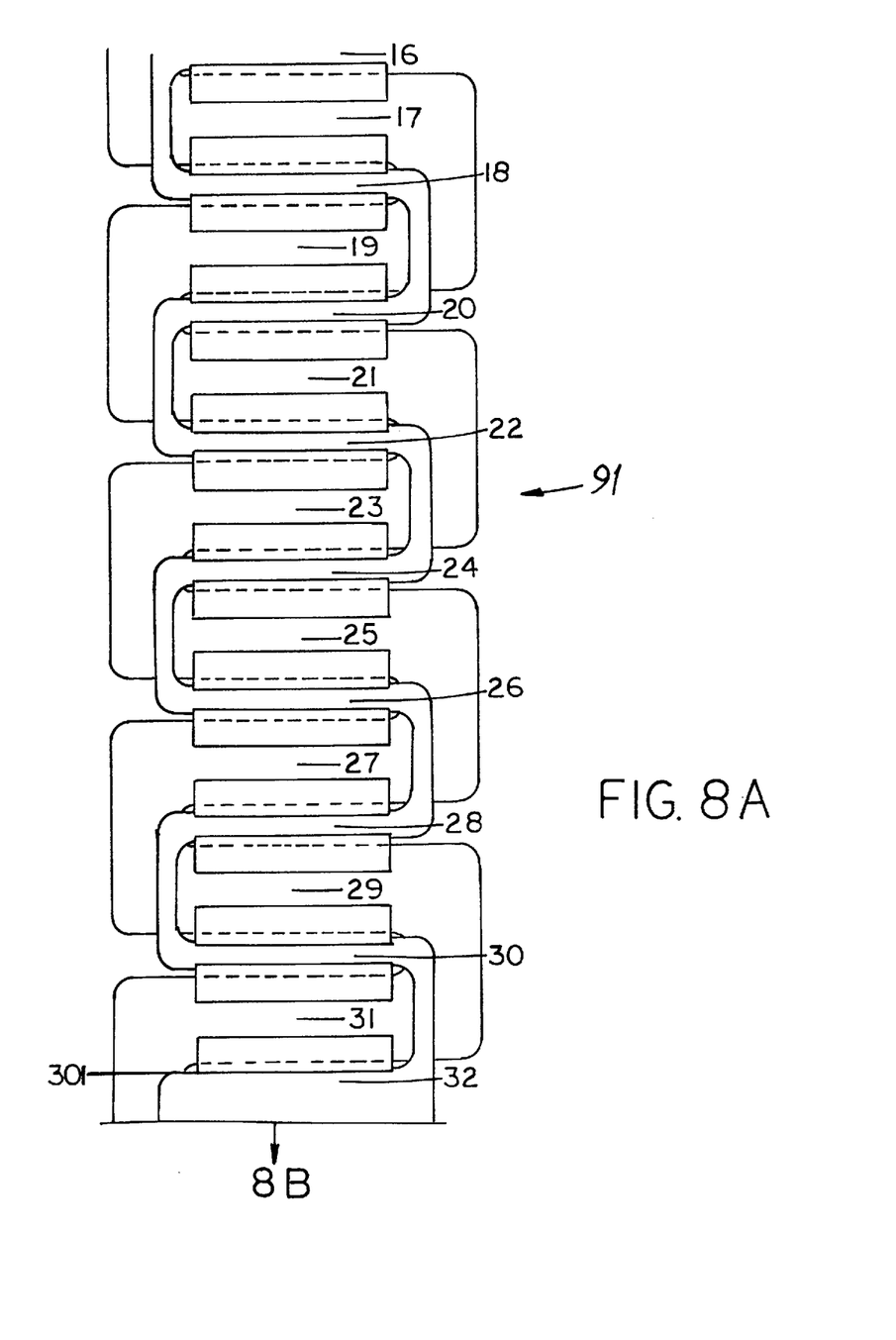
FIGS. 8A and 8B comprise a "laid out" view of the welder stator.
Figure 8B:
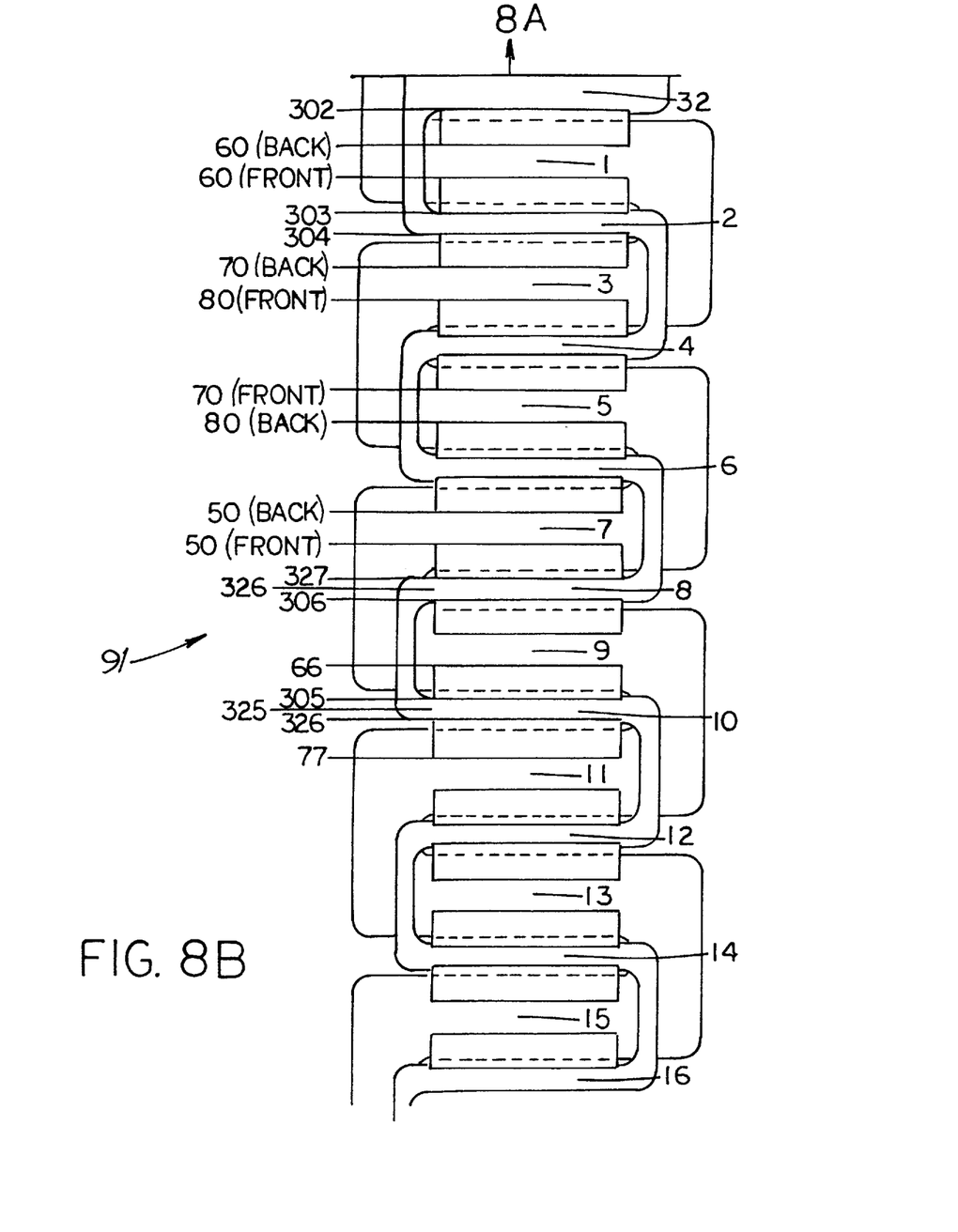

FIGS. 7, 8A, 8B and 10 through 19, and the following table disclose and correlate wire numbers and the slot number in which a particularly-numbered wire begins:

| Wire Number | Slot Number |
| --- | --- |
| 60 (Back) | 1 |
| 60 (Front) | 1 |
| 70 (Back) | 3 |
| 70 (Front) | 5 |
| 80 (Back) | 5 |
| 80 (Front) | 3 |
| 50 (Back) | 7 |
| 50 (Front) | 7 |
| 66 | 9 |
| 77 | 11 |
| 306 | 8 |
| 305 | 10 |
| 303 | 2 |
| 301 | 32 |
| 304 | 2 |
| 302 | 32 |
| 325 | 10 |
| 326 | 10 |
| 326 | 8 |
| 327 | 8 |

The stator core 97 is laminated to reduce eddy current losses and thin plates each shaped as shown in FIG. 7, may be stacked to make such laminated core 97. A highly preferred approach to stator lamination is disclosed in the above-noted U.S. Pat. No. 5,489,811 (Kern et al.) which is incorporated herein by reference.

Figure 9:
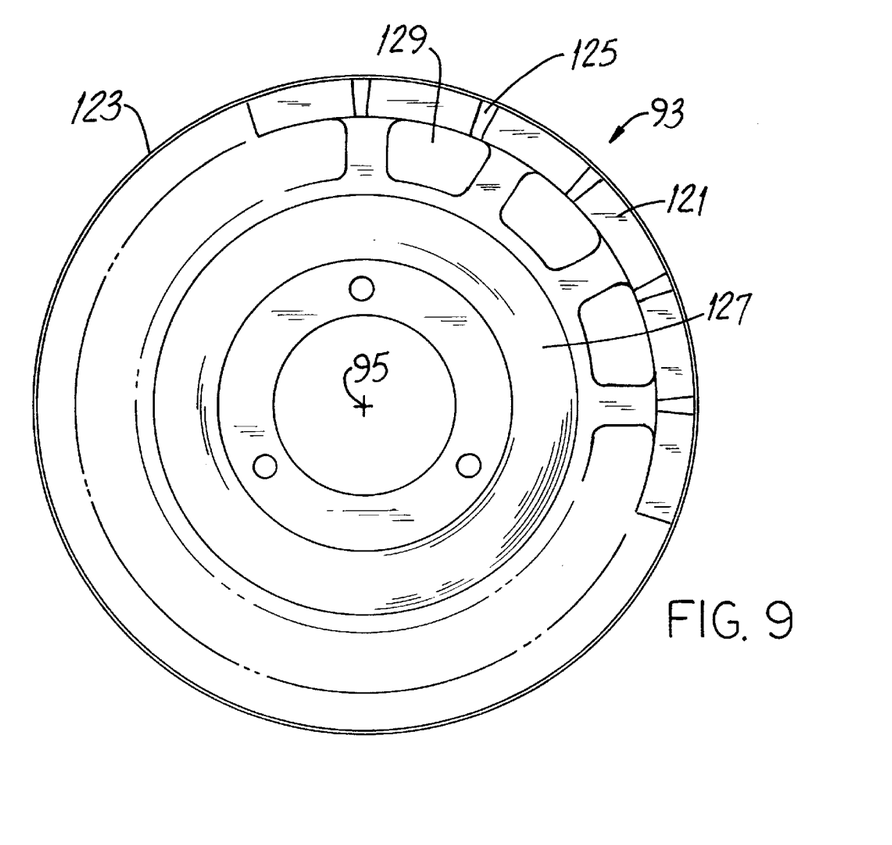
FIG. 9 is a view of the welder rotor taken along the viewing axis VA9 of FIG. 4.
Figure 10:
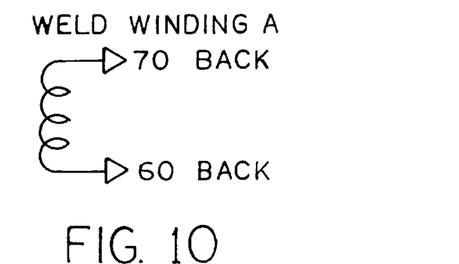
FIGS. 10 through 19 are representation of respective welder main and ancillary windings.
Figure 11:
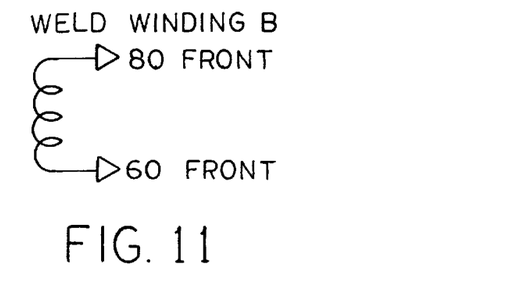
Figure 12:
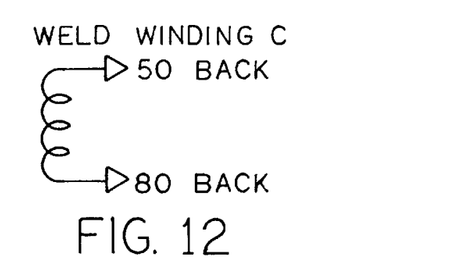
Figure 13:
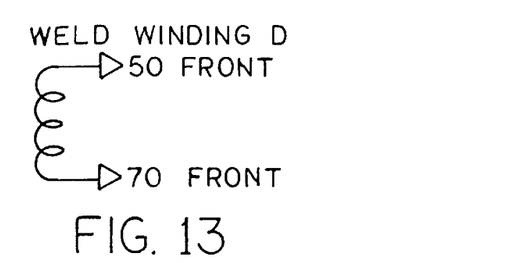
Figure 14:
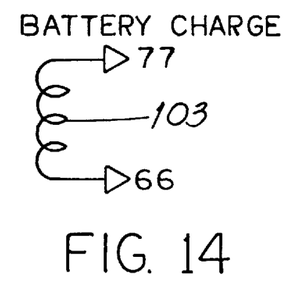
Figure 15:
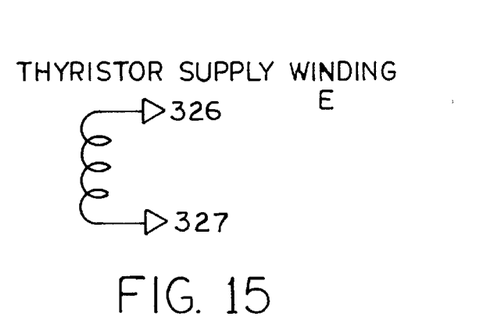
Figure 16:
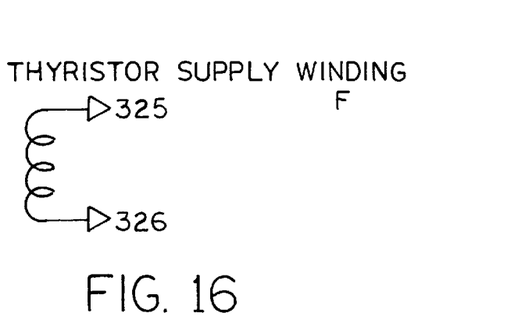
Figure 17:
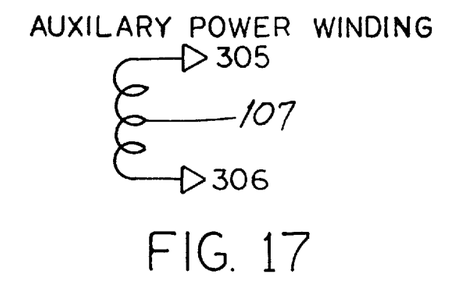
Figure 18:
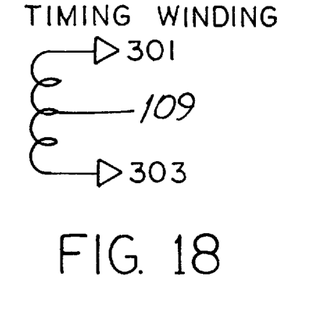
Figure 19:
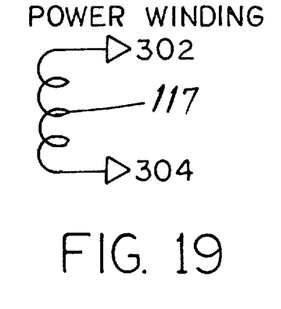
Figure 20:
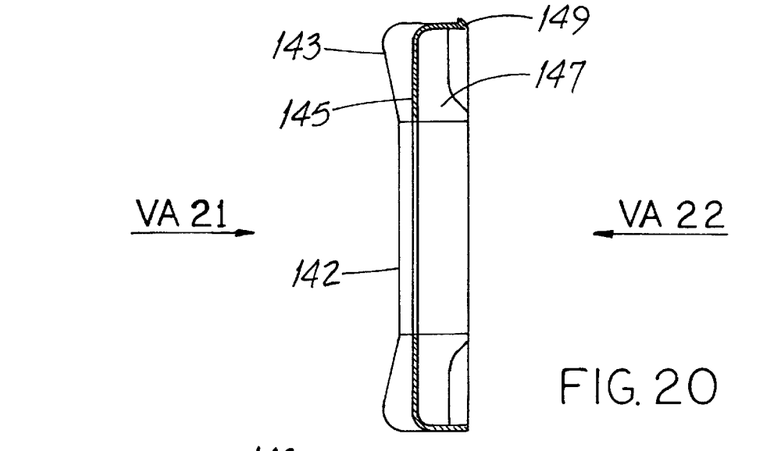
FIG. 20 is an edge view, in section, of the welder cooling fan.
Figure 21:
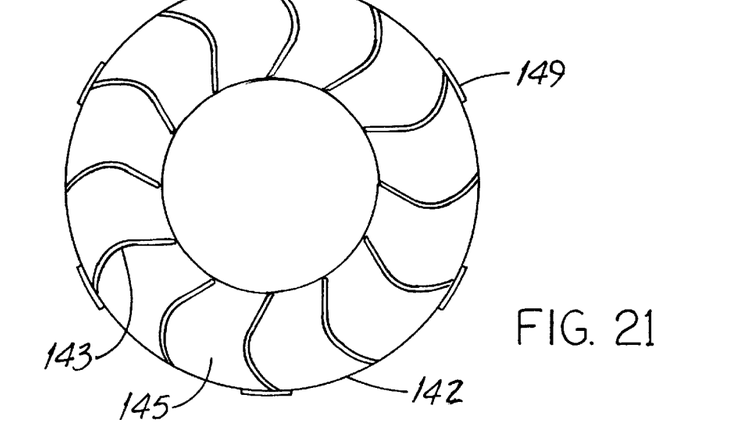
FIG. 21 is a full-representation view of the welder cooling fan taken along the viewing axis VA21 of FIG. 20.
Figure 22:
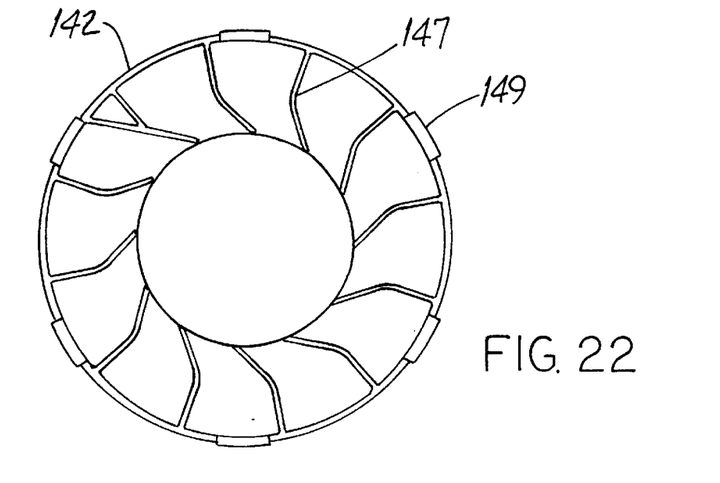
FIG. 22 is another full-representation view of the welder cooling fan taken along the viewing axis VA22 of FIG. 20.
Figure 23:
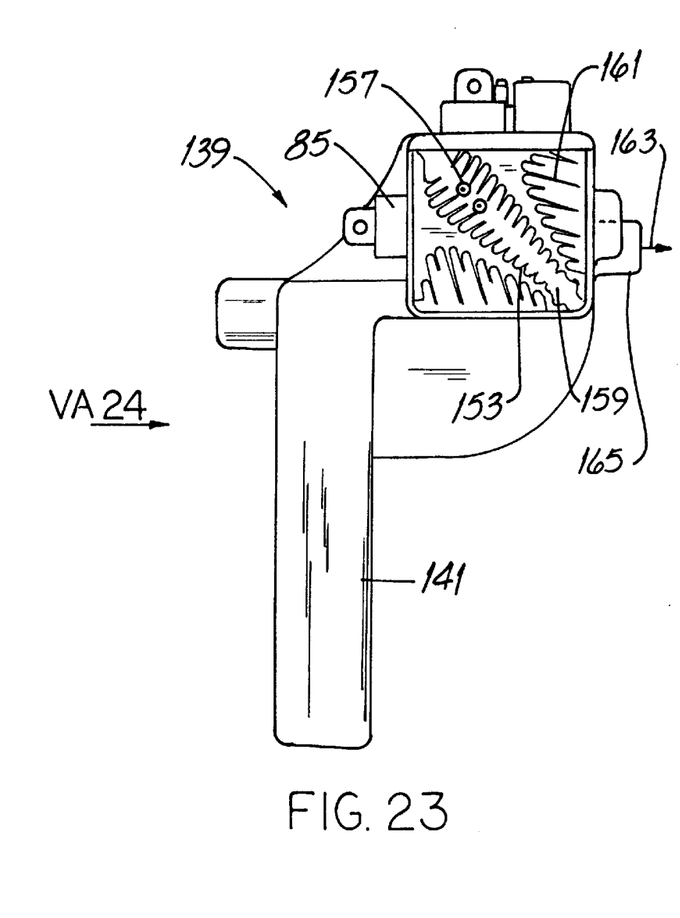
FIG. 23 an elevation view of the welder cooling apparatus taken from the perspective of FIG. 4.
Figure 24:
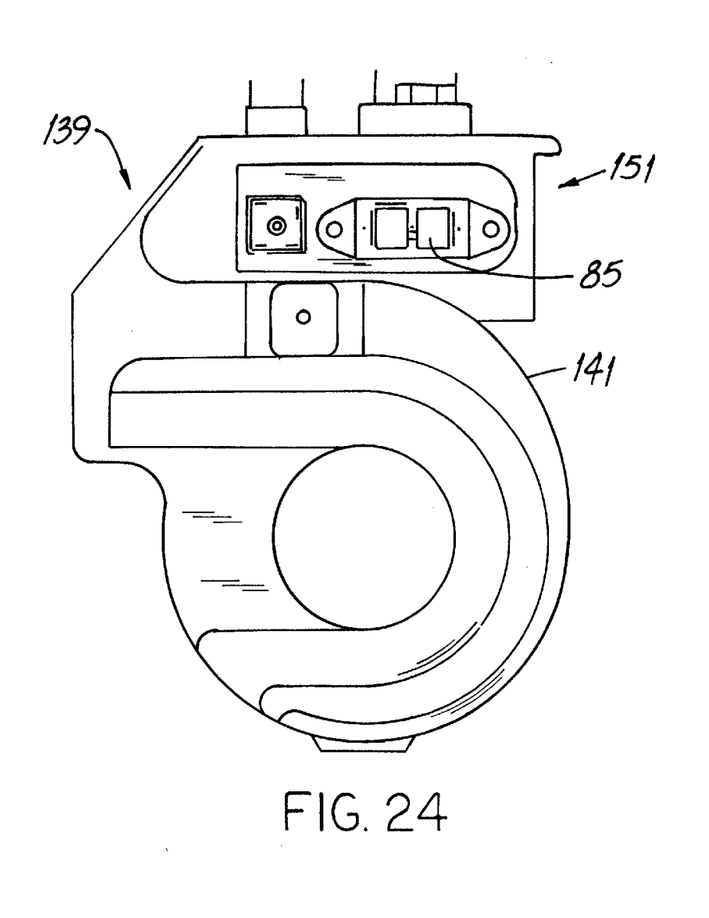
FIG. 24 is an elevation view of the welder cooling apparatus taken along the viewing axis VA24 of FIG. 23.

The new arc welder 40 has yet other features contributing to its improved size-to-power ratio and before describing such features, it will be helpful to have an understanding of other aspects of the welder 40. Referring to FIGS. 4, 7 and 9, the welder 40 has a generating section comprising the stator 91 and the revolving, cup-shaped rotor 93. The stator 91 is fixed with respect to the rotor 93 which is driven by the welder prime mover, the engine 81. The rotor 93 has elongate, generally rectangular permanent magnets 121 spaced around and affixed to the interior perimeter of the rotor shell 123. The magnets 121 are parallel to and spaced equidistant from the axis of rotation 95 and each pair of magnets 121 has a notch 125 therebetween.

The shell 123 has a back plate 127 which is generally perpendicular to the axis of rotation 95 and through which air-circulation openings 129 are formed. The plate 127 is bolted to a drive coupling 131 which is also affixed to the engine shaft 133 and rotates with such shaft 133. Because the rotor 93 must rotate with respect to the stator 91 to generate electrical power, the rotor magnets 121 are radially spaced from the stator 91 and the stator 91 and magnets 121 define a radially-thin annular clearance 135 space therebetween. And the coupling 131 and the stator 91 define an annular space 137 therebetween which might be described as radially-thick. The way in which cooling air is circulated along such above-mentioned notches 125 and spaces 135, 137 is described below.

Referring next to FIGS. 3, 4, 9, 20 through 24, the welder 40 has a cooling apparatus 139 including an air duct 141 and a centrifugal fan 142 mounted for rotation with respect to the duct 141. The fan 142 includes a first set of blades 143 projecting in a first direction away from the fan body 145 and a second set of blades 147 projecting in a second direction from such body 145. In a specific embodiment, the directions are 180° apart. There are clips 149 along the circular edge of the fan 142 and such clips 149 extend through respective rotor openings 129 and "snap fit" to the rotor back plate 127. Thus, the fan 142 rotates with the rotor 93 and as will become apparent, such double-bladed fan 142 performs several cooling functions simultaneously.

The welder has a weld current control section 151 with a plurality of solid state switching devices, e.g., thyristors 85, in heat transfer relationship to a heat sink 153. Such section 151 also has a printed circuit board 154 fixed with respect to the air duct 141.

The first set of blades 143 flows air along a first flow path 155 through the duct 141 to the current control section 151. More specifically, the first flow path 155 comprises a primary path 157 of cooling air flowing through the interstices 159 between the heat sink fins 161 and impinging against such fins 161. (In FIG. 23 the circle dot symbol 157 denotes air flow outwardly toward the viewer.)

A secondary or "branched" path 163 of cooling air is "tapped" from the air flowing through the duct 141 by a branch tube 165 which is in flow communication with the duct 141. Air flowing out of the tube 165 impinges against the printed circuit 154 board for board cooling.

The second set of fan blades 147 flows air along a second flow path 167 through the air-circulation openings 129. Thereafter, the second flow path is "branched" with a first branch flowing through the notches 125, a second branch flowing through the clearance space 135 and a third branch flowing through the space 137. The above-described creative use of a double-bladed fan and multiple air flow paths/branches (five paths/branches in all) provides welder cooling in a very compact space and using components of modest weight.

Another new innovation helps reduce noise and prolong engine life under certain current-dependent operating conditions. In the following discussion, it is assumed that the welder 40 has a maximum rated current (all arc welders have such a rated current) and in a specific embodiment, such rated current is 170 amperes.

Referring to FIGS. 1, 2, 3 and 4, the innovation involves a method for electronically controlling the speed of the engine 81. Considered in more specific terms, the first electrical device is for selecting a value of current and the method includes manipulating the device 63 to select a weld current no greater than the rated maximum current and then contacting a work piece i.e., plates 41, with a welding rod 53 connected to the welder 40. The engine 81 is accelerated to an elevated speed, e.g, the maximum rated speed which, in a specific embodiment, is about 3900 RPM. That weld current which was selected is then determined by, for example, sensing the voltage established across the current-selecting device 63.

The determining step is followed by the step of decelerating the engine 81 to an intermediate speed if the weld current selected is no greater than 50% of the rated maximum current. On the other hand, if the weld current selected is greater than 50% of the rated maximum current, the determining step is followed by the step of maintaining the engine 81 at the elevated speed. In a more specific aspect of the method, the engine 81 is decelerated to an intermediate speed if the weld current selected is no greater than 25% of the rated maximum current or is maintained at the elevated speed if such selected weld current is equal to or greater than 25% of such rated maximum current.

In other, more specific aspects of the method, the welder 40 has a ground terminal 49 and an electrode terminal 51 and the microprocessor 65 has a voltage-sensing circuit 169 coupled thereto for detecting the voltage across the terminals 49, 51. There is also a current-sensing circuit 171 having a current transformer 173 coupled to the microprocessor 65 for detecting the current flowing between the terminals 49, 51.

The contacting step is followed by the steps of providing to the microprocessor 65 a voltage signal through the circuit 169 representing the voltage between the terminals 49, 51. Also provided to such microprocessor 65 is a current signal through the circuit 171, representing the current flowing between the terminals 49, 51. The accelerating step occurs only if the voltage between the terminals 49, 51 is less than a predetermined voltage and the current flowing between the terminals 49, 51 is greater than a predetermined current. (It will be appreciated by those of ordinary skill that the potentiometers 63, 69, the circuits 169, 171 and the other circuits shown in FIG. 3 are not applied directly to the microprocessor 65 but, rather, are suitably buffered, filtered and the like.)

While the principles of the invention have been shown and described in connection with specific embodiments, it is to be understood clearly that such embodiments are by way of example and are not limiting.

What is claimed:

1. A method for arc welding a work piece including, in either order, the steps of:
    selecting a first weld current;
    setting a time interval;
and further including the steps of:
    striking an arc by manually contacting a holder-secured rigid welding rod to the work piece;
    flowing a second weld current through the welding rod, the second weld current being a predetermined percentage of the first weld current; and
    reducing, upon the lapse of the time interval, the current through the rod to the value of the first weld current.

2. The method of claim 1 wherein the selecting step includes manually manipulating a first electrical device coupled to a microprocessor and the setting step includes manually manipulating a second electrical device coupled to the microprocessor.

3. The method of claim 1 wherein weld current is provided by an engine-driven generator in which the engine has an idle speed, an intermediate speed greater than the idle speed and an elevated speed greater than the intermediate speed and:
the flowing step includes accelerating the engine to the intermediate speed; and
the reducing step includes maintaining the speed of the engine at the intermediate speed.

4. The method of claim 1 wherein the time interval is less than six seconds.

5. The method of claim 4 wherein the second welding current is less than 1.8 times the first welding current.

6. A stator for an arc welder, such stator having main power windings and including:
a laminated core;
a first group of slots radially spaced around the core; and
a second group of slots radially spaced around the core, each slot of the second group being interposed between pairs of slots comprising the first group;
and wherein:
each of the slots of both groups has a slot width;
the width of the slots comprising the second group is less than the width of the slots comprising the first group; and
the power windings are lodged entirely in the slots comprising the first group of slots.

7. The stator of claim 6 wherein the stator is in an arc welder driven by an internal combustion engine and the slots comprising the second group of slots include a first slot having a timing winding therein for providing a signal representing engine speed.

8. The stator of claim 7 wherein the arc welder has an auxiliary power outlet and the slots comprising the second group of slots include a second slot having an auxiliary power winding therein for providing electrical power to the auxiliary power outlet.

9. The stator of claim 8 wherein the arc welder has a battery charging outlet and the slots comprising the first group of slots include a slot having a battery-charging winding therein for providing electrical power to the battery charging outlet.

10. The stator of claim 9 wherein arc welder current is provided by thyristors switched to a conducting state by a gate voltage and the slots comprising the second group of slots include a third slot having a gate voltage winding therein for providing the gate voltage.

11. An arc welder having a cooling apparatus including:
an air duct;
a fan mounted for rotation with respect to the duct; and wherein the fan includes:
a fan body;
a first set of blades projecting from the fan body in a first direction; and
a second set of blades projecting from the fan body in a second direction.

12. The arc welder of claim 11 including a weld current control section and wherein the first set of blades flows air along a first flow path through the duct to directly contact the current control section.

13. The arc welder of claim 12 wherein the current control section includes:
a plurality of solid state switching devices in heat transfer relationship to a heat sink; and
a printed circuit board fixed with respect to the air duct;
and wherein the first flow path includes:
a primary path of cooling air impinging against the heat sink, thereby directly cooling the heat sink; and
a secondary path of cooling air impinging against the printed circuit board, thereby directly cooling the printed circuit board.

14. The arc welder of claim 11 including a generating section and wherein the second set-of blades flows air along a floe path for contacting the generator section, thereby directly cooling it.

15. A method for electronically controlling engine speed in an engine-driven arc welder having a rated maximum current, the engine having an idle speed, an intermediate speed higher than the idle speed and an elevated speed higher than the intermediate speed, the welder including a welder controller with a microprocessor having a current-selecting device coupled thereto, the method including:
manipulating the device to select a weld current no greater than the rated maximum current;
manually contacting a work piece with a rigid welding rod connected through a rod holder to the welder;
accelerating the engine to the elevated speed;
determining the weld current which has been selected; and
decelerating the engine to the intermediate speed.

16. The method of claim 15 wherein the decelerating step occurs if the weld current selected is no greater than 50% of the rated maximum current.

17. The method of claim 15 wherein:
the welder has a ground terminal and an electrode terminal;
the microprocessor has a voltage-sensing circuit coupled thereto for detecting the voltage across the terminals;
the microprocessor has a current-sensing circuit coupled thereto for detecting the current flowing between the terminals;
and the contacting step is followed by:
providing to the microprocessor a voltage signal representing the voltage between the terminals;
providing to the microprocessor a current signal representing the current flowing between the terminals;
and wherein:
the accelerating step occurs only if the voltage between the terminals is less than a predetermined voltage and the current flowing between the terminals is greater than a predetermined current.

18. A method for electronically controlling engine speed in an engine-driven arc welder having a rated maximum current, the engine having an idle speed, an intermediate speed higher than the idle speed and an elevated speed higher than the intermediate speed, the welder including a welder controller with a microprocessor having a current-selecting device coupled thereto, the method including:
manipulating the device to select a weld current no greater than the rated maximum current;
manually contacting a work piece with a rigid welding rod connected through a rod holder to the welder;
accelerating the engine to the elevated speed;
determining the weld current which has been selected; and
maintaining the engine at the elevated speed only if the weld current selected is greater than 50% of the rated maximum current.

* * * * *

UNITED STATES PATENT AND TRADEMARK OFFICE
CERTIFICATE OF CORRECTION

PATENT NO. : 5,861,604
DATED       : January 19, 1999
INVENTOR(S) : Graham W. McLean et al.

It is certified that error appears in the above-identified patent and that said Letters Patent is hereby corrected as shown below:

In column 12, line 10 delete "floe" and insert --flow--.

Signed and Sealed this

First Day of June, 1999

Attest:

Q. TODD DICKINSON

*Attesting Officer*     *Acting Commissioner of Patents and Trademarks*